Aug. 19, 1924.

L. J. COSTES 1,505,866

WIND ENGINE

Filed Oct. 6, 1921

INVENTOR
LÉON JULES COSTES
BY
ATTORNEYS

Aug. 19, 1924.

L. J. COSTES 1,505,866

WIND ENGINE

Filed Oct. 6, 1921

INVENTOR
LÉON JULES COSTES
BY
ATTORNEYS

Patented Aug. 19, 1924.

1,505,866

UNITED STATES PATENT OFFICE.

LÉON JULES COSTES, OF PARIS, FRANCE.

WIND ENGINE.

Application filed October 6, 1921. Serial No. 505,825.

*To all whom it may concern:*

Be it known that I, LÉON JULES COSTES, of 86 Avenue Daumesnil, Paris, France, have invented Improvements in and Relating to Wind Engines, of which the following is a full, clear, and exact description.

This invention relates to a wind motor having a vertical axis comprising a wheel provided on its periphery with vanes for receiving the action of the wind, each of which is essentially formed of two parts, one having the shape of a plane rectangular blade, the other forming a gutter, the convex face of which is directed in the direction of rotation of the wheel; the said gutter being arranged in front of the blade in such a manner that a certain interval exists between the front edge of the latter and the inside concave face of the gutter and the two borders of the said gutter being respectively on each side of the plane of the blade which is slightly inclined relatively to the tangent to the wheel so that the blade shall work directly and effectively when it receives the wind from the side on which it produces a useful reaction, and so that the gutter shall work in its turn and shall convert into a useful reaction the rebounding of the wind when it has struck the blade on the side on which it exerts on the latter a braking action.

The blade vanes thus formed are made of sheet iron or any other suitable material fixed vertically upon metallic rims or crowns connected to a central mast forming the driving shaft and maintained in a vertical position by means of stays suitably arranged; the number and the height of the said vanes may be modified according to the power which is required.

For the same object, the motor may comprise one or several superposed wheels in such a manner as to form a kind of rotary tower fixed to a central shaft supported by a tower framework. In both cases the driving shaft may be provided when it has to actuate a pump or other similar apparatus with a device for varying the resisting effort in function of the motive power which depends upon the wind variations.

In the accompanying drawings, which illustrate by way of example only, two modes of construction of a wind motor having a vertical axis according to the present invention.

The wind motor having a vertical axis according to the present invention consists of a motive wheel provided on its periphery with vanes for receiving the wind, each vane consisting of a head $a$ and a blade $b$ made of sheet metal or any other suitable material.

Figure 1:
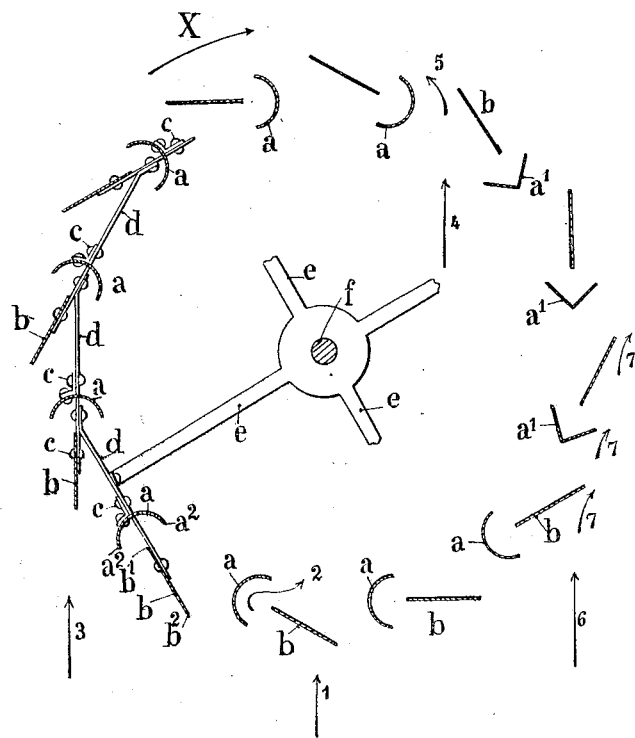
Fig. 1 is a diagrammatical plan view showing the particular arrangement of the blades.

As shown in Fig. 1, the head consists of a kind of gutter $a$ which may be rounded or formed of two plane surfaces meeting each other at a right angle as shown respectively at $a$ and $a^1$; the concave or pointed portion of the gutter is directed in the direction of rotation indicated by the arrow X.

The said gutter is arranged in front and at a certain distance of the front edge $b^1$ of the blade $b$ in such a manner as to leave a certain interval between the said border $b^1$ and the inside concave wall of the gutter $a$, the borders $a^2$ of the second gutter being respectively arranged on each side of the blade $b$ as is clearly shown in Figure 1. The gutter $a$ arranged in front of the extension of the blade $b$ is intended to receive after its rebounding, the wind which has struck the blade $b$ on the side where it produces a braking action, that is on the side where it rebounds towards the front part and therefore pressing the blade $b$ backwards, the U shape of the edge $a$ having for its object to change the direction of the wind towards the rear in such a manner as to produce finally a useful reaction as will be explained hereinafter.

The head $a$ arranged in front of the blade $b$ comes little into action when the wind strikes the blade on the side where it rebounds towards the rear, that is, when it has a useful action on the blade itself. The blade $b$ consists of a sheet of metal which is plane or slightly guttered.

The blade $b$ is so disposed as to lie at a slight angle with respect to the tangent to the wheel and its front edge $b'$ is disposed just inside of the point of tangency.

The front border $b^1$ of the blade is, as said above, at a certain distance from the inside wall of the gutter $a$ and its rear edge $b^2$ is also at a certain distance from the gutter as shown in Fig. 1.

All the gutters $a$ and all the blades $b$ are fixed by any suitable means upon metallic mountings in such a manner as to form a wheel with blades.

In the mode of construction shown in the drawings the heads $a$ and the blades $b$ are fixed at their upper part and their lower part by means of rivets $c$ to a metallic rim $d$ which has preferably the shape of regular polygons comprising as many sides as there are blades for the wheel and which are fixed by means of rigid spokes or stretching spokes $e$ to the central mast $f$ forming the driving shaft.

Figure 2:
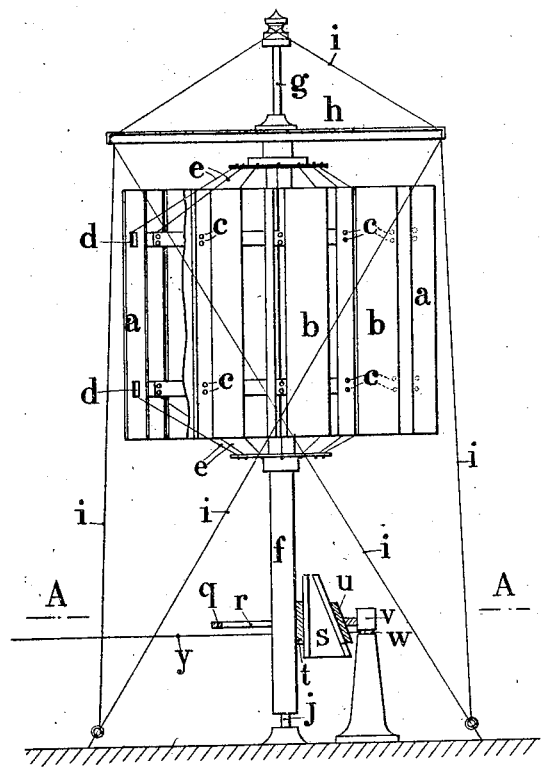
Fig. 2 is a front elevation partly in section of a first mode of construction.
Figure 3:
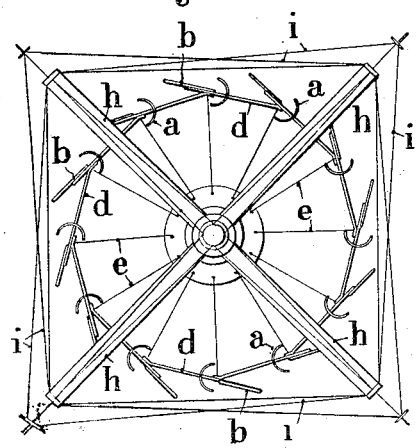
Fig. 3 is a plan.

In the example illustrated in Fig. 2, the mast $f$ is provided at its upper part with a step bearing in which engages a vertical pivot $g$ which may, for instance, be carried by a cross-member $h$ and maintained vertical by means of stays $i$ passing above the wheel or arranged around the latter as illustrated in Figs. 2 and 3 according to the size of the ground on which the motor is mounted. The lower part of the mast $f$ is also provided with a second step bearing in which engages a second pivot $j$ strongly fixed into the ground.

Figure 5:
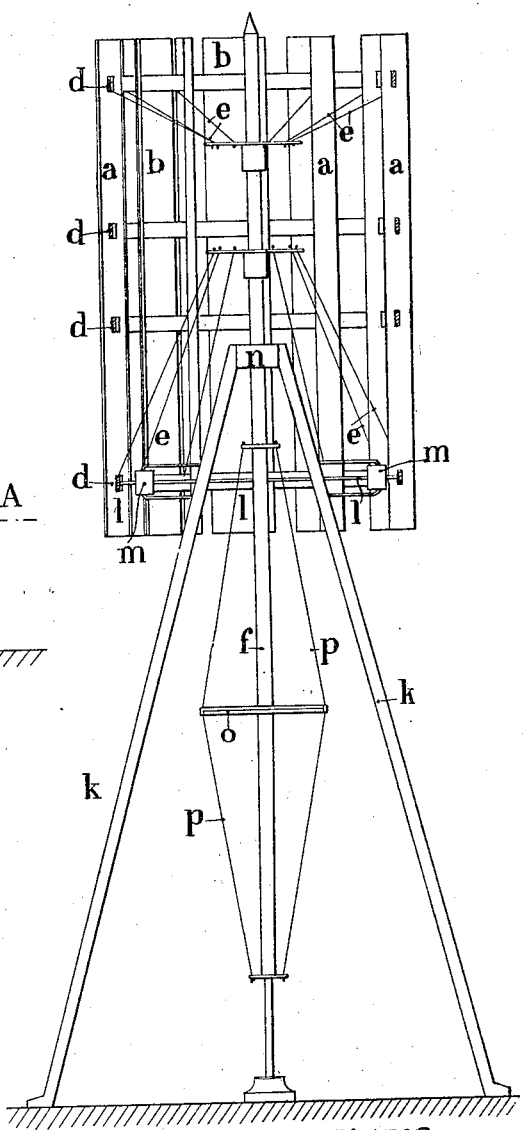
Fig. 5 shows diagrammatically a second mode of construction in a vertical section.

In the example illustrated in Fig. 5 the motive wheel is mounted at its upper part on a tower framework in such a manner as to cover the upper part of the said tower, that is the lower part of said wheel which is provided with a circular wheel $l$ is arranged lower than the top of the frame and bears rotatively upon rollers $m$ fixed on the arms of the said tower framework.

The upper part of the wheel which supports then the whole weight of the wheel is fixed at the upper part of the shaft $f$ which it carries over in its rotation.

The said shaft which traverses the upper part of the framework in ball bearings $n$ and extends to the ground as shown in Figure 5 is provided in the latter example with a cross $o$ and with stays $p$ intended to ensure the rigidity of the said shaft.

The wind motor above described may serve for any uses of motive power and for actuating mechanical toys or anemometers. It is normally intended to rotate around a vertical axis in such a manner as to utilize the wind received from any side, but it may be mounted on a horizontal axis perpendicular to the direction of the wind in the case, for instance, when an air current would be available which would be always directed in the same direction.

In the case when the motor has to actuate a pump or similar apparatus, it is provided with a device which varies the resisting effort in function of the motive power which depends on the variations of the wind.

Figure 4:
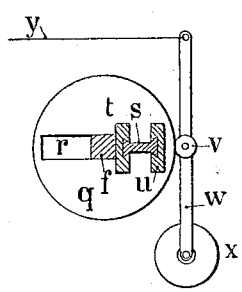
Fig. 4 is a section along the line A—A of Fig. 2.

The said device illustrated in Figs. 3 and 4 consists of a variable eccentric mounted at the lower part of the mast $f$.

The disc $q$ of the said eccentric is provided with a radial slot $r$ and may be displaced along horizontal guiding members which have not been shown and which are fixed to the mast, in such a manner as to have a more or less great eccentricity relatively to the said mast with which it rotates.

The displacement of the plate $q$ is obtained by the movement of a wedge $s$ which rises and descends along the mast. The two inclined sides of the wedge $s$ have a dovetailed section and engage in a guiding member of corresponding shape, one member of which, $t$, is fixed to the mast and the other member $u$, is fixed to the eccentric disc $q$.

When the wedge rises, the two guiding members move apart from each other and the disc becomes eccentric. When the wedge falls down under the action of its own weight, the guiding members come nearer to each other and the disc is centred again.

The rotatable eccentric $q$ bears at its periphery against a roller $v$ which, through the intermediary of a lever $w$ oscillating around a fixed point and of a rod $y$ which is brought back by means of a spring, transmits the variable alternating movement to the piston of a pump or to any other apparatus of utilization. The said eccentric may also be surrounded with a collar and transmit an alternating movement with double effect.

The wedge $s$ is connected to a ball governor in such a manner that as the speed increases owing to the action of the wind, the wedge rises and the stroke of the pump increases.

When the motor does not comprise the above described eccentric it may serve to drive any mechanism.

This motor works in the following manner:

The wind acts differently at various points of the wheel.

At 1, that is everywhere where the wind has a tendency to enter the wheel it meets a blade $b$, the inclination of which produces a braking action, but the wind rebounds on the said blade towards the gutter $a$, the inside of which it follows and presses it back. Finally it escapes at 2 in a direction which is almost opposite to its direction of rebounding the blade $b$.

To sum up, it produces in the useful direction X after the said various changes of direction, as experience proves it an impulsion to the escaping action due to the last reaction.

At 3 the wind acts by means of a direct pressure upon the various elements, gutters and blades which are arranged so as to utilize in the best possible manner the said pressure by presenting to the wind erect, turned up ends.

At 4, that is everywhere where the wind escapes from the wheel it acts in the useful direction X by escaping at 5 by reaction on the blade which owing to its inclination and thanks to the position of two neighbouring gutters utilizes then itself the said reaction.

The effects of the gutters which are complex, but are not important here may be neglected.

At 6 the wind produces a pressure which brakes, it is true, the working of the apparatus, but the said braking is not important in view of the small inclination of the ends of the elements; gutters and blades which are placed upon each other and are hiding behind each other.

The wind is thus pressed back at 7 and surrounds the said part of the wheel by sliding on it.

The novelty and essential principle of the apparatus consists in the means adapted for effecting the addition of the motive actions for the wind which enters the wheel at 1 and for the wind which leaves the wheel at 4, that is for the wind which strikes the blade in two opposite directions. This means consists in this, that in one case a secondary reaction is used at 1 in the gutter, after rebounding of the blade, while in the other case at 4 the wind acts by direct simple reaction in contact with the blade.

The result would be approximately the same if the opposite manner of operation would be adopted, that is, if simply the direct reaction would be utilized for the wind which enters the wheel and the secondary reaction after rebounding for the wind escaping from the wheel. In this case it would be necessary to reverse the inclination of the blade in such a manner that the end $b^2$ of the blade instead of escaping towards the outside of the wheel shall enter towards the inside.

This addition of the motive actions for winds coming from two opposite directions is applicable also to sailers and to other cases where the pressure of a gaseous fluid is utilized.

The motor having a vertical axis above described has the important advantage of utilizing the wind from any sides whatever and does not require to be directed.

Moreover it follows from the study of its working and more especially from experience that the wind acts with a high efficiency upon the largest part of the periphery of the wheel, while the braking action is very small so that a very important power is obtained.

The constructive arrangements above described have been given by way of example only, the shapes, materials and sizes of the various constituting parts may be modified without departing from the spirit of the invention.

Claims—

1. In a wind motor, a vane including a gutter, and a flat blade, the blade having its forward edge slightly spaced from the gutter and being disposed rearwardly of the gutter in the direction of rotation of the vane.

2. A wind motor comprising a shaft and a plurality of vanes disposed in circular series around the shaft and carried thereby, each vane including a gutter and a flat blade, the blade having its forward edge spaced from the gutter and being disposed rearwardly of the gutter in the direction of rotation of the vane, the longitudinal center line of the gutter lying in the plane of the blade and the blade being inclined with respect to the tangent of the wheel.

The foregoing specification of my improvements in and relating to wind engines, signed by me this 22nd day of September, 1921.

LÉON JULES COSTES.